Dec. 15, 1936.                H. W. CARRIER                2,064,730
                         UTILITY AND ANIMAL SHEARS
                            Filed April 28, 1936
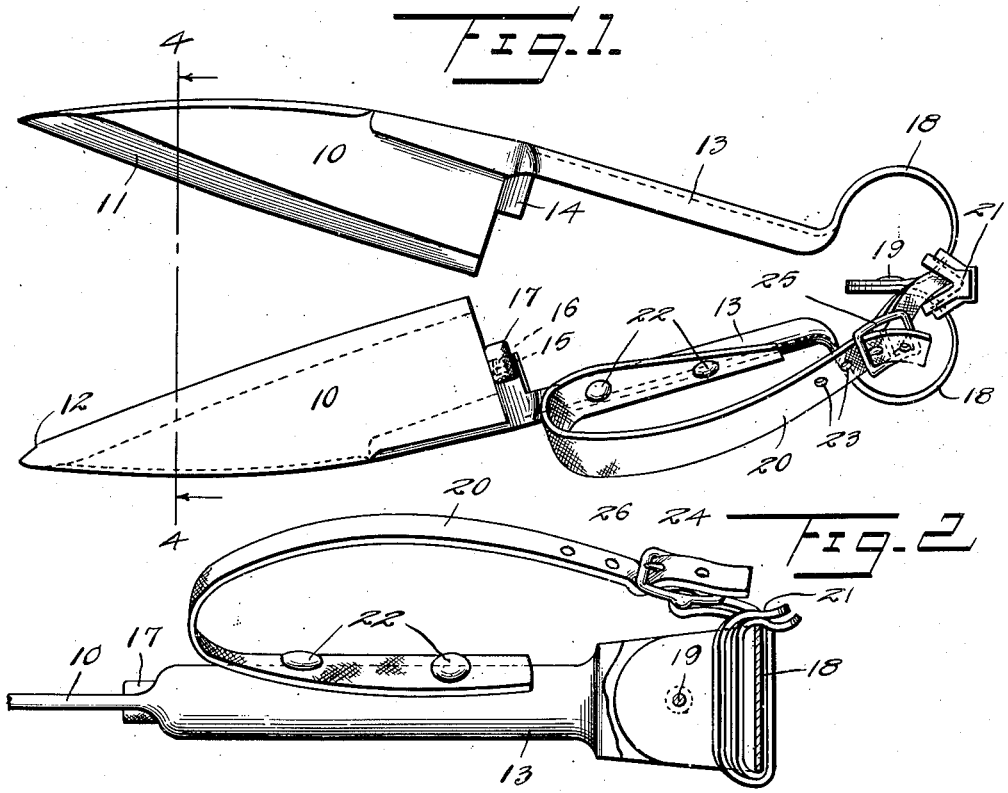
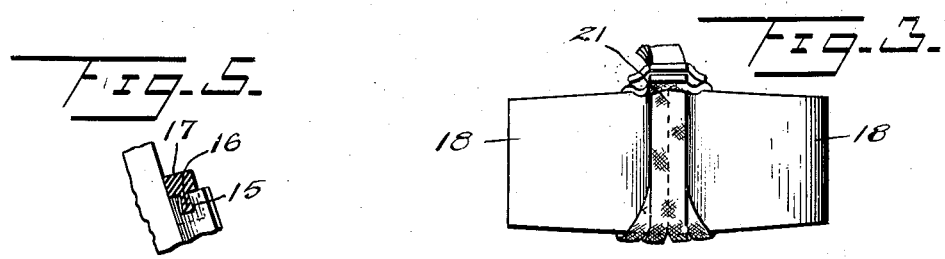
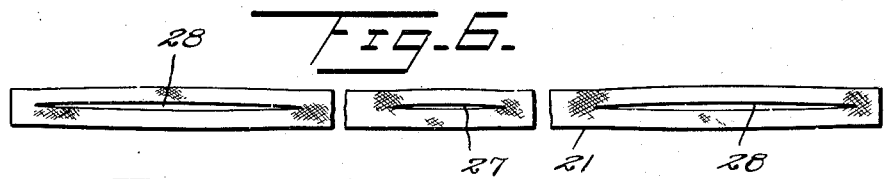
Inventor
H. W. Carrier Patented Dec. 15, 1936

2,064,730

UNITED STATES PATENT OFFICE 2,064,730

UTILITY AND ANIMAL SHEARS

Hiram W. Carrier, Atlantic, Pa.

Application April 28, 1936, Serial No. 76,835

2 Claims. (Cl. 30—1)

This invention relates to animal shears and particularly to sheep shears and it aims to provide a novel construction of shear which is adapted to be sold ready for use.

It is generally aimed to provide existing constructions and particularly with respect to means for preventing the sticking of the shears into the animal's hide, to provide a bevel of the cutting edge wider at the point than at the rear end and gradually diminishing from the point towards the latter end, to provide a novel bumper adjacent one blade for abutment by the other blade and to provide a novel strap to prevent the hands from moving out of place, to provide novel means for connecting the strap to the bows of the handle and to provide a blade which is straighter at its cutting edge than heretofore allowing for a larger bite.

Various additional objects and advantages will become apparent from a consideration of the description following taken in connection with accompanying drawing illustrating an operative embodiment.

In said drawing:—

Figure 1 is a plan view of animal shears constructed in accordance with the invention;

Figure 2 is a longitudinal sectional view taken on the line 2—2 of Figure 1;

Figure 3 is an end elevation at the handle;

Figure 4 is a cross sectional view taken on the line 4—4 of Figure 1;

Figure 5 is a detail longitudinal sectional view showing the mounting of the bumper and Figure 6 is a plan view of one section of the buck strap.

Referring specifically to the drawing wherein like reference characters designate like or similar parts, the animal shears or the like have similar blades at 10 whose cutting edges are relatively straight and beveled as at 11, with the bevel at the points wider than at the opposite ends, and gradually diminishing in width from the points to the latter ends. In order to prevent penetration of the points of the blades into the hide of the animal, the same are ground off or rendered blunt at an angle as at 12.

Integral with or welded to the blade ends are handles 13 and the rear ends of the blades have lugs extending obliquely therefrom as at 14, being adapted for contact to limit the movement of the blades toward each other. In order to cushion such contact, one of the lugs 14, as best shown in Figures 1 and 5, is provided with a dovetail slot 15 which snugly receives a similarly shaped projection 16 on a bumper 17, the latter being of leather, rubber or any suitable, preferably flexible material, which it will be noted, is disposed in the path of movement of the other lug 14.

Said handles 13 at their rear ends have arcuate bows 18 which are resilient and enable the handles to be pressed toward each other and then spring apart so that the cutting edges of the blades will co-act, it being realized that such cutting edges are beveled from opposite sides and each from one side only as best shown in Figure 4.

The bows 18 have inwardly extending contacting portions secured together in any suitable manner as by means of welding, a rivet 19 or both, or otherwise.

To prevent undue movement of the hand along the shears while being used, a buck strap is provided consisting of two sections 20 and 21. Said sections are preferably of leather or equivalent flexible material and the section 20 is riveted as at 22 to one of the handles 13. The free end of such section 20 has a plurality of openings 23 therethrough whereby the section 20 may be detachably connected to the pin 24 pivoted to an intermediate cross bar 25 of a buckle 26 carried by the buck strap section 21.

Said buck strap section 21 consists of a single strand or length provided intermediate its ends with a slit 27 whereby it may straddle the cross bar 25 with the pin extending through the slit 27. The strap thus doubled upon itself is anchored on the inwardly extending portions of the bows 18 by projection of the latter through aligning slits 28 of such section 21. Thereupon, the section 21 is looped about the bows and the opposite end including the buckle 26, is passed through the slits 28 as shown in Figure 1, thus detachably anchoring the same on the bows 18.

It will be understood that in addition to using the shears for shearing sheep, that they may be used for roaching horses' manes, clipping grass, trimming hedges and other purposes in which a fine cutting edge would be adaptable and suggested.

Various changes may be resorted to provided they fall within the spirit and scope of the invention.

I claim as my invention:—

1. Shears of the class described having co-acting blades, handles carrying said blades and provided with spring bows, said bows having forwardly projecting portions secured together, a strap section having an opening through which said portions project, a portion of said strap also passing through said opening at the rear of said projecting portions whereby the strap section is looped about the projecting portions, and a second strap section, said second strap section being connected to one of the handles, and a buckle connecting the strap sections adjustably together.

2. Shears of the class described having blades, handles extending from the blades, bows on the handles connected together and having an inwardly extending portion, an adjustable buck strap, said buck strap at one end being secured to one of the handles and at the other end having an opening through which the inwardly extending portion projects, the strap having a portion passed through the opening to surround part of the handle whereby the strap is secured to said projection.

HIRAM W. CARRIER.